J. C. THOMPSON.
GEARING DEVICE FOR WASHING MACHINES.
APPLICATION FILED JULY 22, 1912.
1,235,509.
Patented July 31, 1917.
3 SHEETS—SHEET 1.
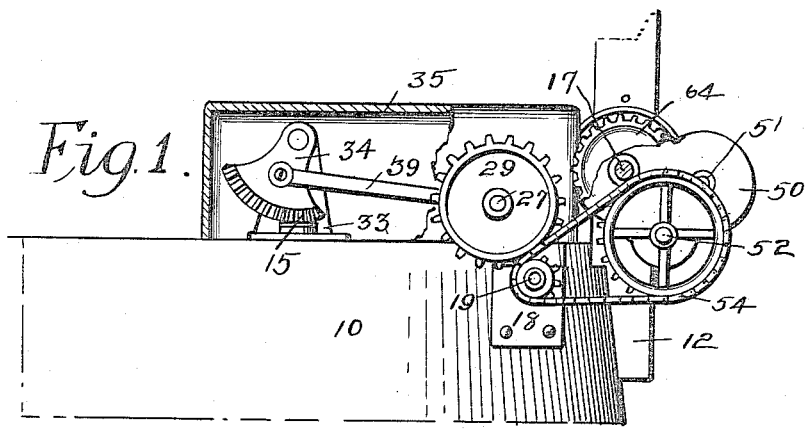
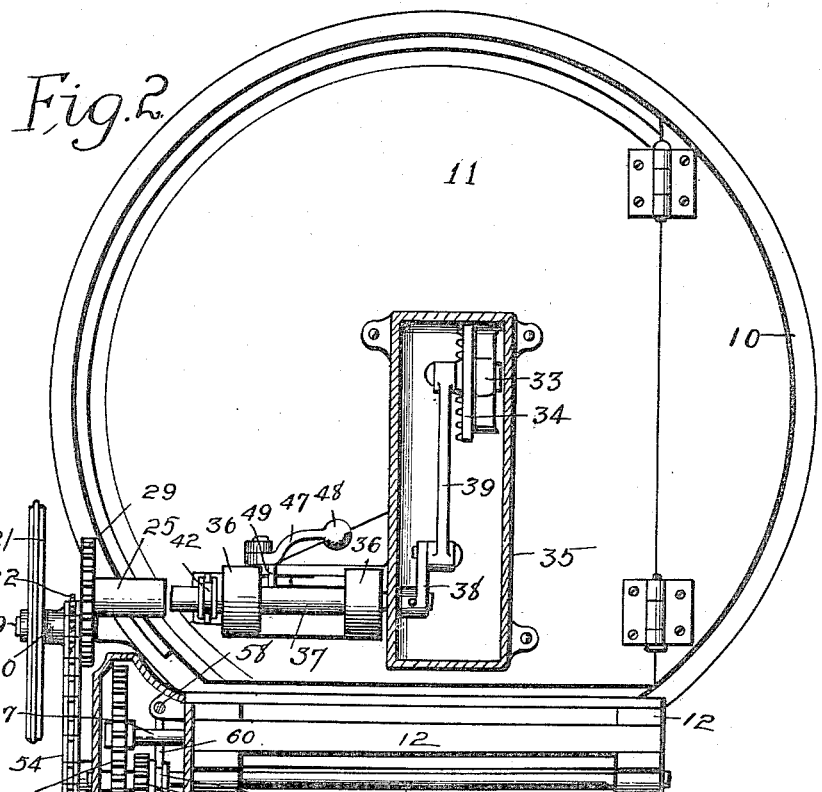

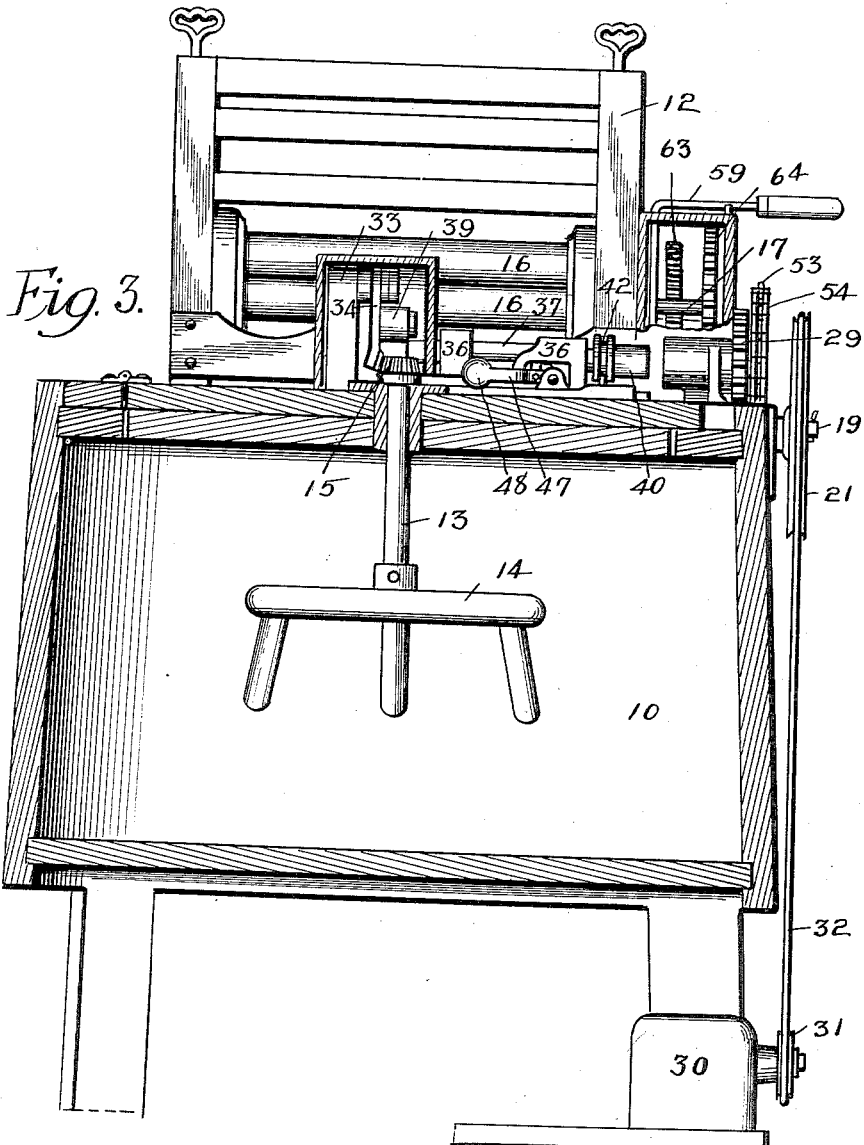

J. C. THOMPSON.
GEARING DEVICE FOR WASHING MACHINES.
APPLICATION FILED JULY 22, 1912.
1,235,509.
Patented July 31, 1917.
3 SHEETS—SHEET 3.
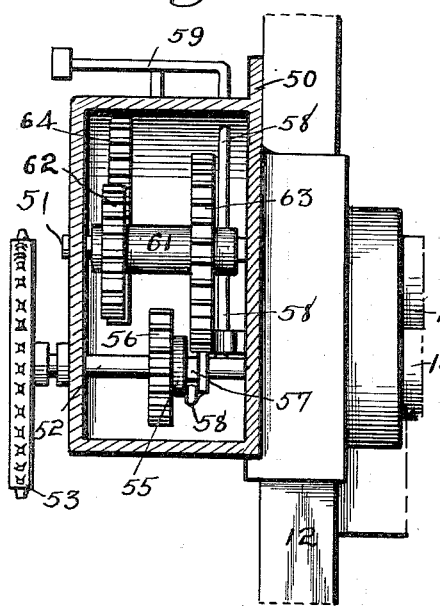
Fig. 4.
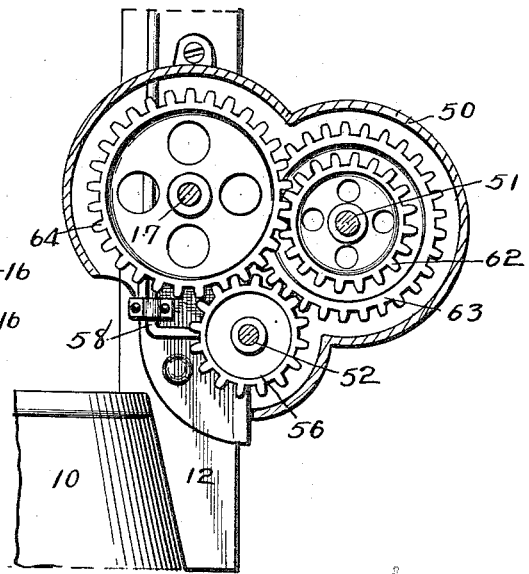
Fig. 5.
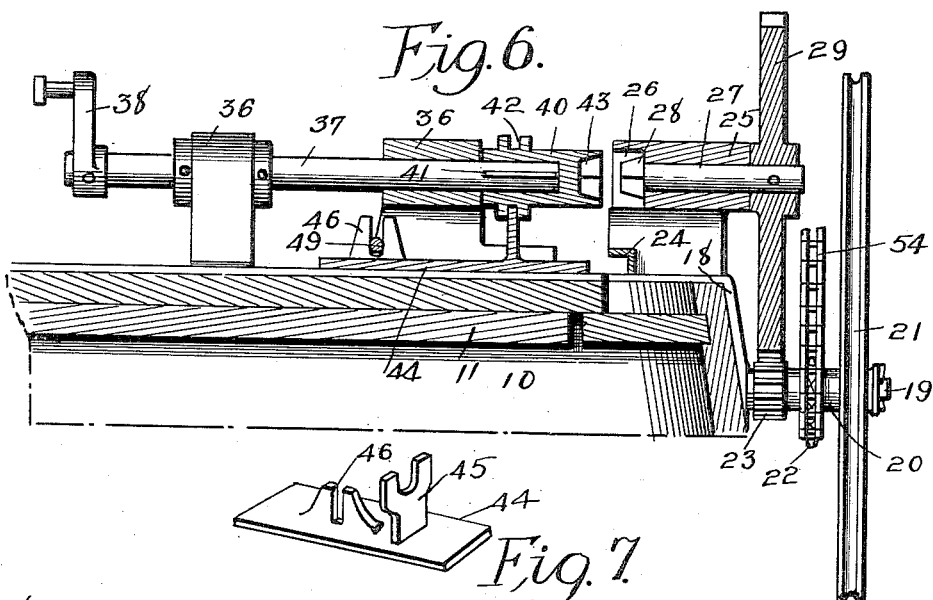
Fig. 6.
Fig. 7.
Witnesses
A. G. Hague
W. A. Loftus
Inventor
John C. Thompson
by Ewig & Bair atty

UNITED STATES PATENT OFFICE.

JOHN C. THOMPSON, OF CINCINNATI, OHIO.

GEARING DEVICE FOR WASHING-MACHINES.

1,235,509.     Specification of Letters Patent.     Patented July 31, 1917.

Application filed July 22, 1912. Serial No. 710,983.

*To all whom it may concern:*

Be it known that I, JOHN C. THOMPSON, a citizen of the United States, residing at Cincinnati, in the county of Hamilton and State of Ohio, have invented a certain new and useful Gearing Device for Washing-Machines, of which the following is a specification.

The object of my invention is to provide a device of the class described of simple, durable and inexpensive construction and in which the operative gearing devices are closely assembled within a small space upon a washing machine body.

A further object is to provide a device of this kind in which the main power shaft is fixed to a bracket at one side of the tub and projects outwardly therefrom and all of the other shafts of the gearing devices are arranged parallel with the main power shaft, thus avoiding the necessity of beveled gears and the like.

A further object is to provide improved means for operatively connecting and disconnecting the gearing devices carried by the hinged lid of the washing machine from the gearing devices carried by the body of the washing machine so that before the lid can be raised the gearing devices must be operatively disconnected and when the cover is closed and latched the gearing devices will be operatively connected; and further to provide a connection for these gearing devices which is protected or shielded in such a manner that clothes or the like are not likely to become caught therein; and further in this connection it is my object to provide means whereby the cover may be closed and the gearing devices on the cover may either be in operative engagement with the gearing devices on the tub or may be out of operative engagement therewith; and also to provide a device of this kind in which the cover cannot be raised even to the slightest degree without first disconnecting the gearing devices thereon.

My invention consists in certain details, in the construction, arrangement and combination of the various parts of the device, whereby the objects contemplated are attained, as hereinafter more fully set forth, pointed out in my claims and illustrated in the accompanying drawings, in which:

Figure 1 shows a vertical, central, sectional view through a washing machine having my improved gearing device applied thereto, a part of the gearing case on the wringer frame being shown in section to show the interior construction thereof.

Fig. 2 shows a top or plan view of a device embodying my invention, the top of the gear case on the wringer frame being removed.

Fig. 3 shows a side elevation of a part of a washing machine and wringer frame having my improved gearing device applied thereto, a part of the gear case for the dolly shaft operating mechanism being broken away.

Fig. 4 shows a top or plan view of a part of a wringer frame, the gear case attached thereto being shown in section to show the gearing device contained therein.

Fig. 5 shows a side view of same, the side of the gear case being removed.

Fig. 6 shows a sectional view through a part of a washing machine taken on a line at the shaft for operating the dolly, and Fig. 7 shows a detail, perspective view of the sliding bar for latching the hinged cover to the washing machine frame when closed.

Referring to the accompanying drawings, I have used the reference numeral 10 to indicate generally the frame of the washing machine having thereon the usual hinged cover 11. 12 indicates a wringer frame of ordinary construction bolted to the tub. Mounted within the hinged cover is the upright shaft 13 of the dolly 14 having on its upper end a beveled pinion 15. The wringer rolls are indicated by the numeral 16 and one of them has its shaft extended through the wringer frame, whereby the rolls may be driven, the extension of said shaft being indicated by the numeral 17.

The parts just described are all of the ordinary construction now in general use in connection with gearing devices of this class.

My improved gearing device comprises a bracket indicated generally by the reference numeral 18. It is fixed to the side of the tub opposite from the hinged portion of the cover and adjacent to the wringer frame. It is provided at its lower portion with a stationary shaft 19 extending straight outwardly from the bracket and parallel with the wringer rolls. On this shaft 19 is a sleeve 20 and connected to this sleeve are the belt pulley 21, a sprocket wheel 22 and the pinion 23. Formed on the upper part of this bracket 18 above the top of the tub is a shoulder 24 spaced apart from the top of the tub to receive the latch device hereinafter described. Above the shoulder 24 the bracket has a bearing 25 provided with an annular recess at 26. Rotatably mounted in the bearing 25 is a shaft 27 having an angular head 28 within the recess 26, the head being large enough to engage the adjacent portion of the bearing 25 to thereby prevent outward movement of the shaft 27. On the other end of the shaft is a large pinion 29 in mesh with the pinion 23, the pinion 29 being fixed to the shaft 27.

When the gearing device is to be operated by an electric motor the motor which is indicated by the numeral 30 is preferably mounted beneath the tub and is provided with a small pulley 31, and this pulley is connected by a belt 32 with the pulley 21.

It is obvious that if desired the pulley 21 may be driven from a gasolene engine or other suitable source of power.

Mounted on top of the cover is a bracket 33 to which is pivoted a segmental rack 34 in mesh with the beveled pinion 15. Mounted on the cover surrounding the segmental rack 34 is a casing 35 to completely inclose the segmental rack 34. This casing has an extension at one side containing bearings 36 for the shaft 37. Said shaft 37 is extended through the case 35 and is provided with a crank arm 38 thereon which crank arm is connected by means of a pitman 39 with the segmental rack 34 so that the case 35 incloses all of the movable parts on top of the cover that might in any way become caught in clothes. On the end of the shaft 37 opposite from the crank 38 is a sliding sleeve 40 on the shaft 37 and provided with a spline 41 to prevent its rotation relative to the shaft 37. This sleeve is provided with an annular groove 42 near its central portion and its outer end is provided with an angular socket 43 designed to clutch with the angular head 28 and to be received within the annular recess 26. The said shaft 37 is in line with the shaft 27 when the cover is in its closed position, and obviously when the sleeve 40 is in its extended position the shafts 37 and 27 will be operatively connected, and when the sleeve 40 is in its withdrawn position, as shown in Fig. 6, the shafts 37 and 27 will be operatively disconnected and the cover may be raised.

I have provided a convenient and easily operated means for moving the sleeve 40 and also for locking or unlocking the cover. This means comprises a slide bar 44 on top of the cover and provided with a forked extension 45 inserted in the annular groove 42 and also provided with a slotted extension 46. Mounted adjacent to the slotted extension 46 is a lever 47 having a weighted handle 48 at its upper end and also having an arm 49 above its pivotal point inserted in the slotted extension 46. When said weighted handle 48 is at one position of its movement, as shown in Fig. 1, the sleeve 40 is withdrawn and when it is in its other position the sleeve is extended into engagement with the angular head 28. The weight prevents the lever 47 from remaining in a neutral position; hence the sleeve must be at either one of its limits of movement and when in either position the weight is sufficient to hold it there without any attention on the part of the operator. The outer end of the bar 44 is so arranged that when the sleeve 40 is in its extended position, the bar 44 will enter beneath the shoulder 24 and thus form a latch device for securing the cover in its closed position.

The means for operating that part of my improved gearing device that is applied to the wringer frame comprises a gear case 50 fixed to the wringer frame and having the wringer shaft 17 extended through it and also having two other shafts 51 and 52 extended through it. On the outer end of the shaft 52 is a large sprocket wheel 53 connected by a chain 54 with the sprocket wheel 22. On the shaft 52 within the gear case is a sleeve 55 slidingly and nonrotatably mounted and having thereon a small pinion 56 and also having an annular groove 57. Mounted within the gear case is an upright shaft 58 having a handle 59 at its upper end and also having in its lower end the arm 60 inserted in the annular groove 57 so that the sleeve may be thereby shifted. Rotatably mounted upon the shaft 51 is a sleeve 61 having fixed on one end a relatively small pinion 62 and on the other end a small pinion 63, and fixed to the shaft 17 is a large pinion 64. These pinions are so proportioned and positioned within the gear case that when the pinion 56 is moved to its limit outwardly away from the wringer frame, it will be in mesh with the pinion 64 and hence the shaft 17 will be rotated in one direction by a rotary movement applied to the shaft 52. When the sleeve 55 is moved inwardly a short distance it will be out of engagement with all of the other pinions and the wringer rolls will not be driven. This position is illustrated in Fig. 4. When the pinion 56 is moved to its inward limit it will be in mesh with the pinion 63 and when the shaft 52 is rotated in the same direction as that which is before described motion will be transmitted through the pinion 63, the sleeve 61 and the pinion 62 to the pinion 64, it being understood that the pinions 62 and 64 are always in mesh, whereupon the wringer roll shaft 17 will be rotated by the shaft 52 in a direction opposite from the instance before given.

My improved gearing device has many structural advantages and the parts are all closely assembled in a compact form upon adjacent portions of the tub and wringer frame. When the cover is open and the operator is standing on the side of the tub opposite from the winger clothes may be taken by the operator from the tub and placed in the wringer and the gearing devices do not in any way interfere with this operation. When the cover is open, obviously the dolly does not operate. By having all of the shafts of the gearing device parallel with each other, I avoid the necessity of the use of beveled gears.

The main power shaft and the short shaft on top of the tub are both connected to a single bracket and are operatively connected by gears which reduce the speed as applied to the upper shaft. This makes the device of very simple and compact form and the power shaft or sleeve may be cast complete in one piece including the large pulley, the sprocket wheel and the pinion; hence power may be transmitted by very simple, inexpensive and direct acting devices from the power shaft or sleeve to the wringer operating mechanism and the dolly operating mechanism.

My improved means for operating the dolly and for throwing it into and out of operative position is extremely simple, inexpensive and practical and it has the advantage of permitting the operator to close the lid and thus retain the heat of the water within the tub during the time that the wringer is being operated, and when the wringer is being operated the dolly may be made to operate or may be held inoperative just as desired. It is however objectionable to permit the dolly to operate when the cover is raised. In my improved gearing device this is impossible for the reason that before raising the cover it is necessary to disconnect the shafts 27 and 37 and this is done by moving the slide 44 which is also a latch device. Therefore, whenever the cover is closed and the dolly shaft being operated the cover is securely latched in its closed position which is obviously a great advantage.

The part of my gearing that is connected to the wringer frame forms a separate unit and the wringer frame can be readily and easily detached with all of the gearing for operating the wringer by simply removing the sprocket chain 54. All of the gears in the wringer attachment are ordinary toothed pinions which may be readily and easily cast without machine work and I have done away with the use of clutch devices, beveled pinions and the like which are expensive to make and are likely to get out of order.

I claim as my invention:

1. In a device of the class described, the combination of a frame having a hinged member, an upright driven shaft in the hinged member, a shaft on the side of the frame, means for rotating it, a pinion on the shaft, a short shaft on the frame above the first shaft, a pinion connected therewith and in mesh with the pinion on the first shaft, a shaft mounted on the hinged member in line with the short shaft on the frame, means for operatively connecting or disconnecting the two latter shafts, a crank on the inner end of the last mentioned shaft, a pitman connected therewith, a pivoted rack connected to the pitman, and a beveled gear on the upright driven shaft in mesh with said pivoted rack.

2. In a device of the class described, the combination of a frame, a hinged member for the frame, a short shaft rotatably mounted on the frame and provided with an angular inner end portion, a shaft mounted on the hinged member in line with said shaft on the frame, a sleeve slidingly and non-rotatably mounted on the shaft of the hinged member and having an angular end to coact with the angular end of the shaft on the frame, a slide bar mounted on the hinged member, means for operating the slide bar, means carried by the slide bar for moving said sleeve, and means on the frame provided with a shoulder to coact with the slide bar for latching the hinged member in a closed position when the sleeve is moved to position to engage the shaft on the frame, an upright driven shaft in the hinged member, and means interposed between the shaft on the hinged member and the said upright driven shaft for imparting an alternating rotary motion to the latter by a continuous rotary motion of the former.

3. In a device of the class described, the combination of a frame having a hinged member, a bracket fixed to the frame and formed with a shoulder adjacent to the hinged member, said bracket being also formed with a bearing and being provided with an annular recess at the inner end of the bearing, a short shaft mounted in said bearing and having an angular head to engage the end of the bearing within said recess, a pinion on the outer end of said shaft, means for driving the pinion, a shaft mounted upon the hinged member in line with the said shaft, a sleeve slidingly and nonrotatably mounted on the shaft on the hinged member, said sleeve being provided with an annular groove and also with an angular socket designed to receive the said angular head and to enter the said annular recess, a slide bar on the hinged member having an arm to enter the groove of the sleeve and also having a slotted upright, a lever fulcrumed to the cover and having an arm extended into the slotted extension, a weight on said lever, said parts being so arranged that when the weight is in one position the sleeve will be withdrawn from engagement with the shaft on the frame and when in another position the sleeve will be in engagement with the shaft on the frame, said slide bar being so arranged that when the sleeve is in the latter position it will engage and coact with the shoulder in the bracket on the frame to latch the hinged member in a closed position.

4. In a gearing device of the class described especially designed for operating a power driven washing machine, the combination of a frame having a hinged member, a shaft mounted upon the frame at the side thereof opposite from the hinged edge of the hinged member, means whereby said shaft may be continuously rotated in one direction, a second shaft mounted upon the hinged member and in line with the first mentioned shaft, manually controlled means whereby these shafts may be operatively connected or disconnected, a vertically arranged driven shaft in the hinged member, and means between the said second shaft and the said vertically arranged shaft for imparting an alternating rotary motion to the vertical shaft by a continuous rotary motion of the said second shaft, for the purposes stated.

5. In a gearing device of the class described, the combination of a frame, a hinged member on the frame, a vertically arranged shaft in the hinged member, a horizontally arranged driving sleeve at the side of the frame, a short shaft on the frame adjacent to the driving sleeve and arranged horizontally, means between the driving sleeve and the short shaft for rotating the latter upon a rotation of the driving sleeve, a horizontally arranged driven shaft on the hinged member in line with the said short shaft, manually controlled means for operatively connecting and disconnecting the said short shaft and the horizontally arranged driven shaft, and means between the horizontally arranged driven shaft on the hinged member and the said vertically arranged shaft in the hinged member for imparting an alternating rotary motion to the latter by continuous rotary motion of the former, for the purposes stated.

Des Moines, Iowa, February 17, 1912.

JOHN C. THOMPSON.

Witnesses:
F. E. THOMPSON,
EDWARD H. LILLIE.